Nov. 27, 1923.
H. A. PETRIE
1,475,869
AUTOMATIC STABILIZER FOR AEROPLANES
Filed July 22, 1921 7 Sheets-Sheet 1
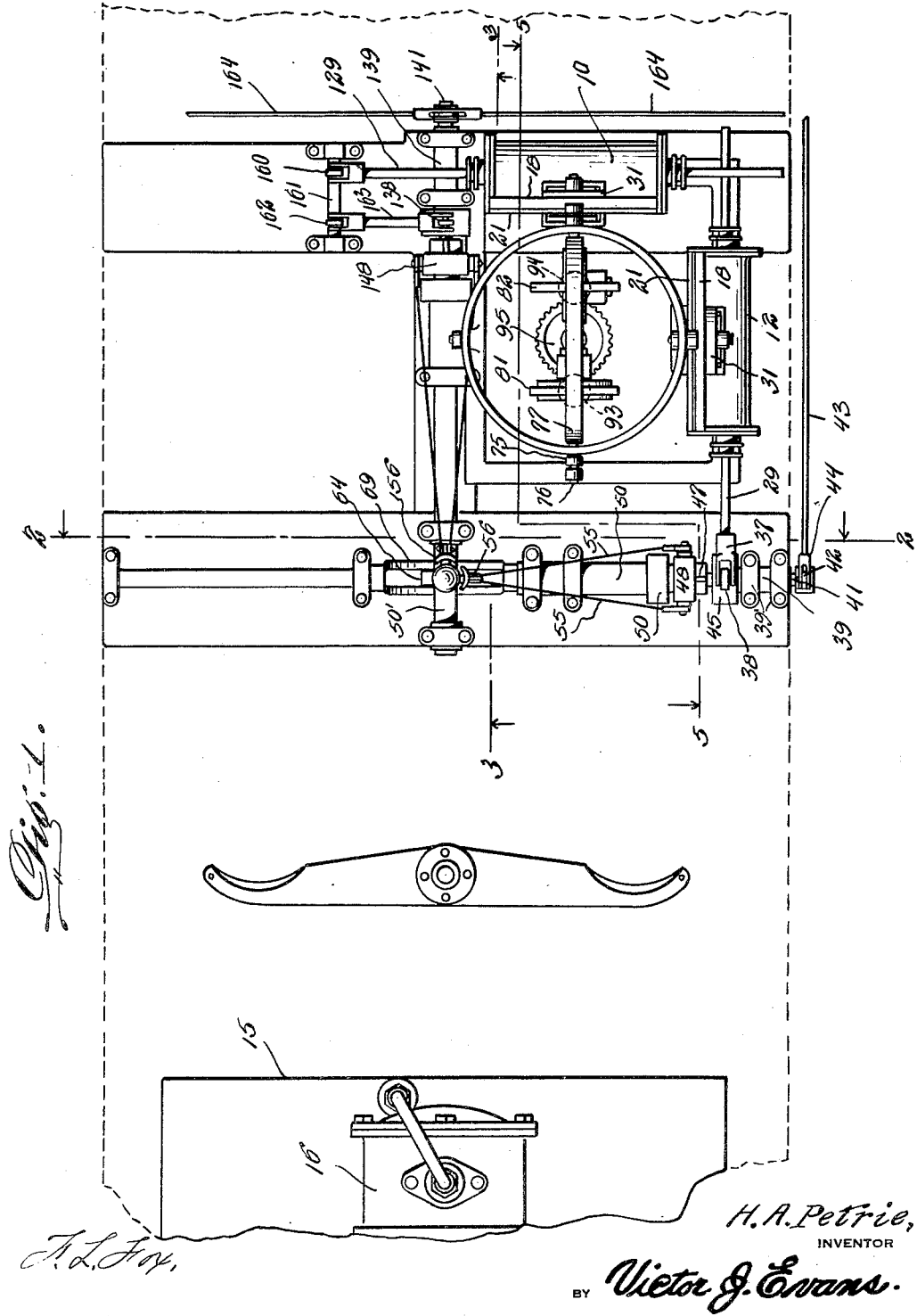

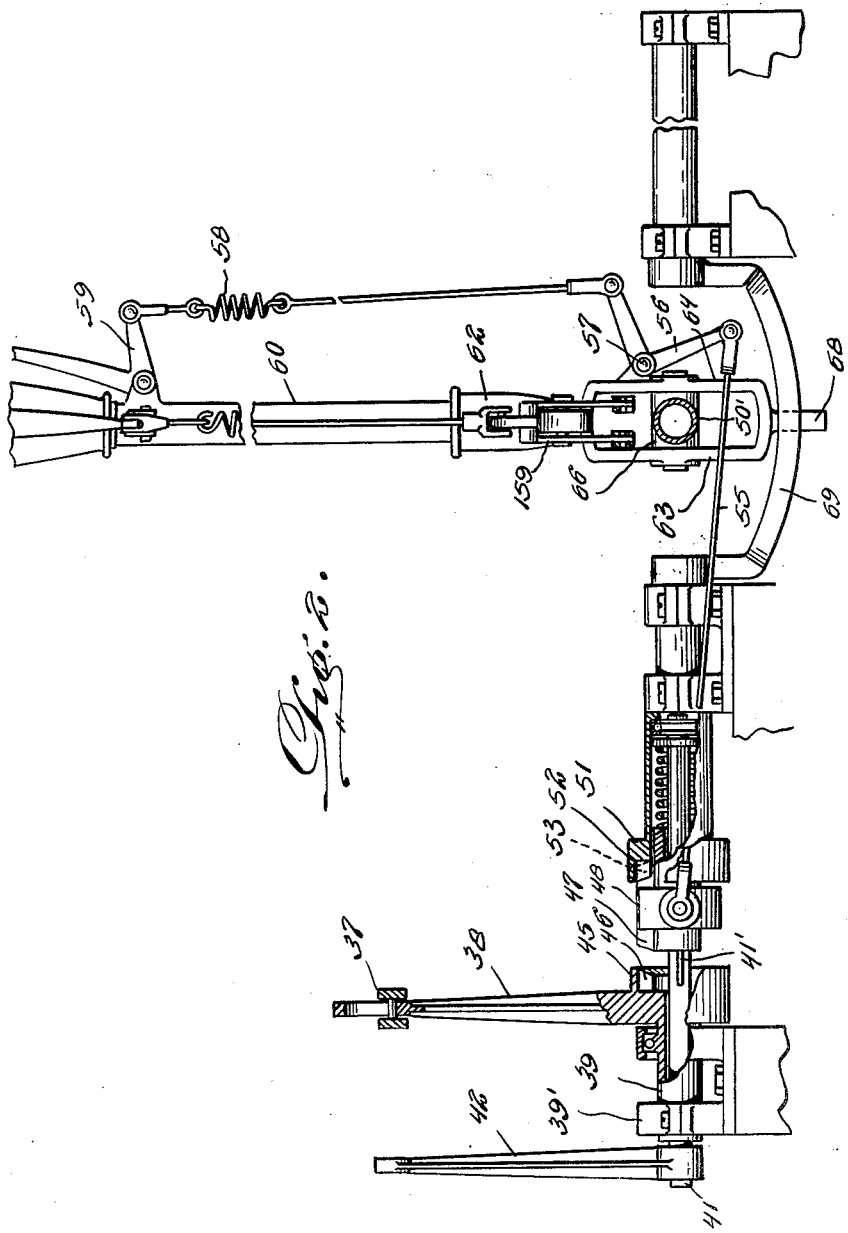

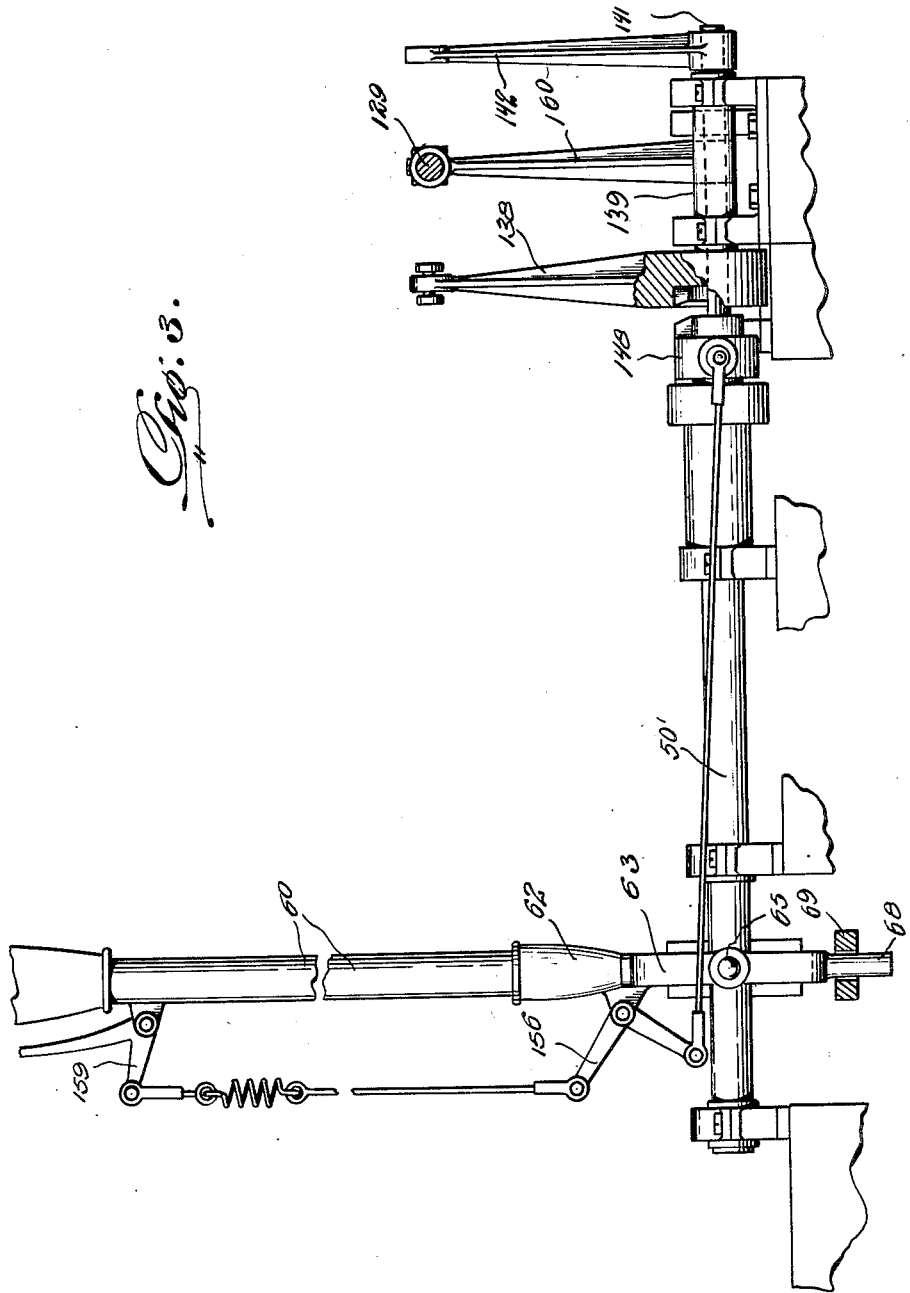

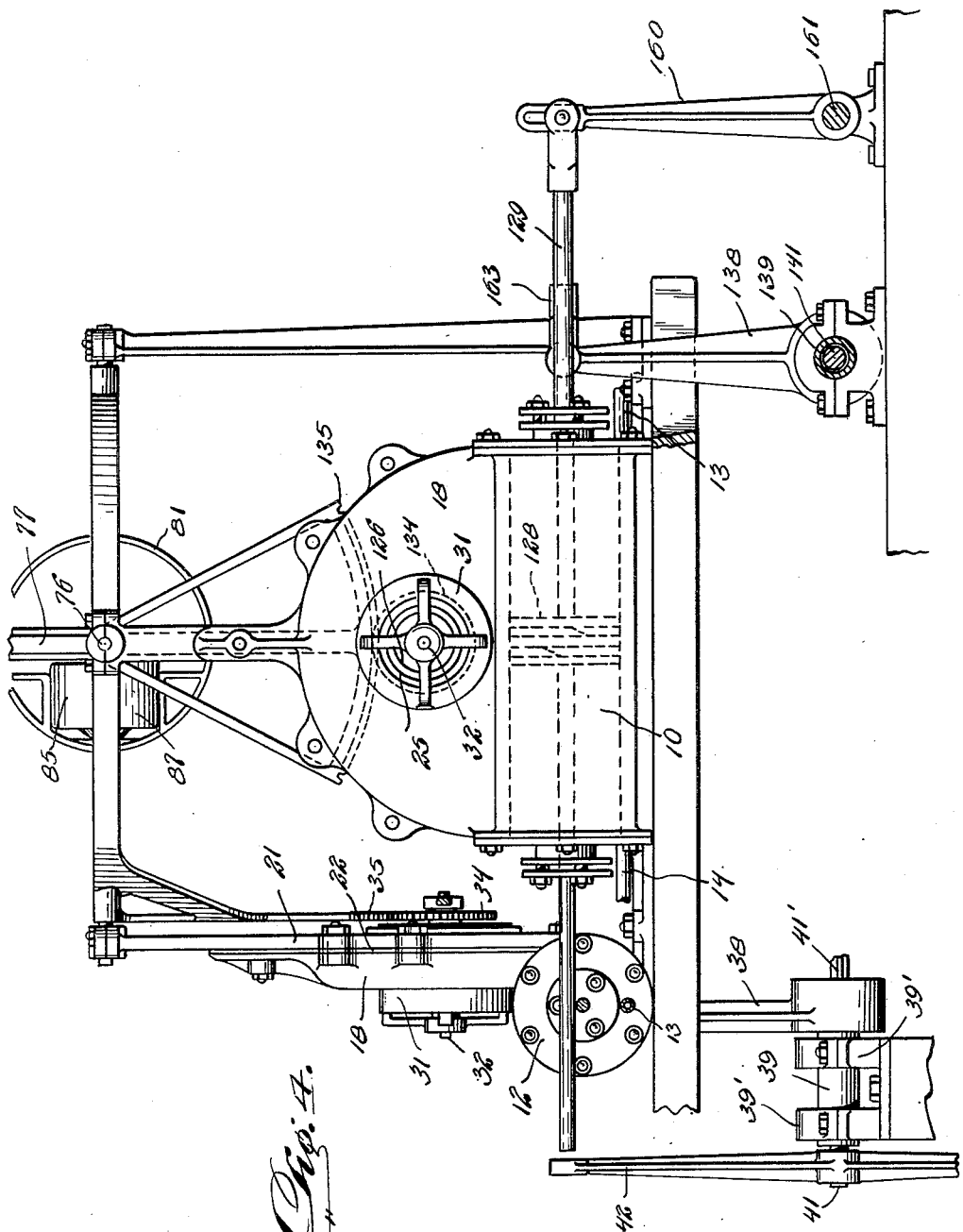

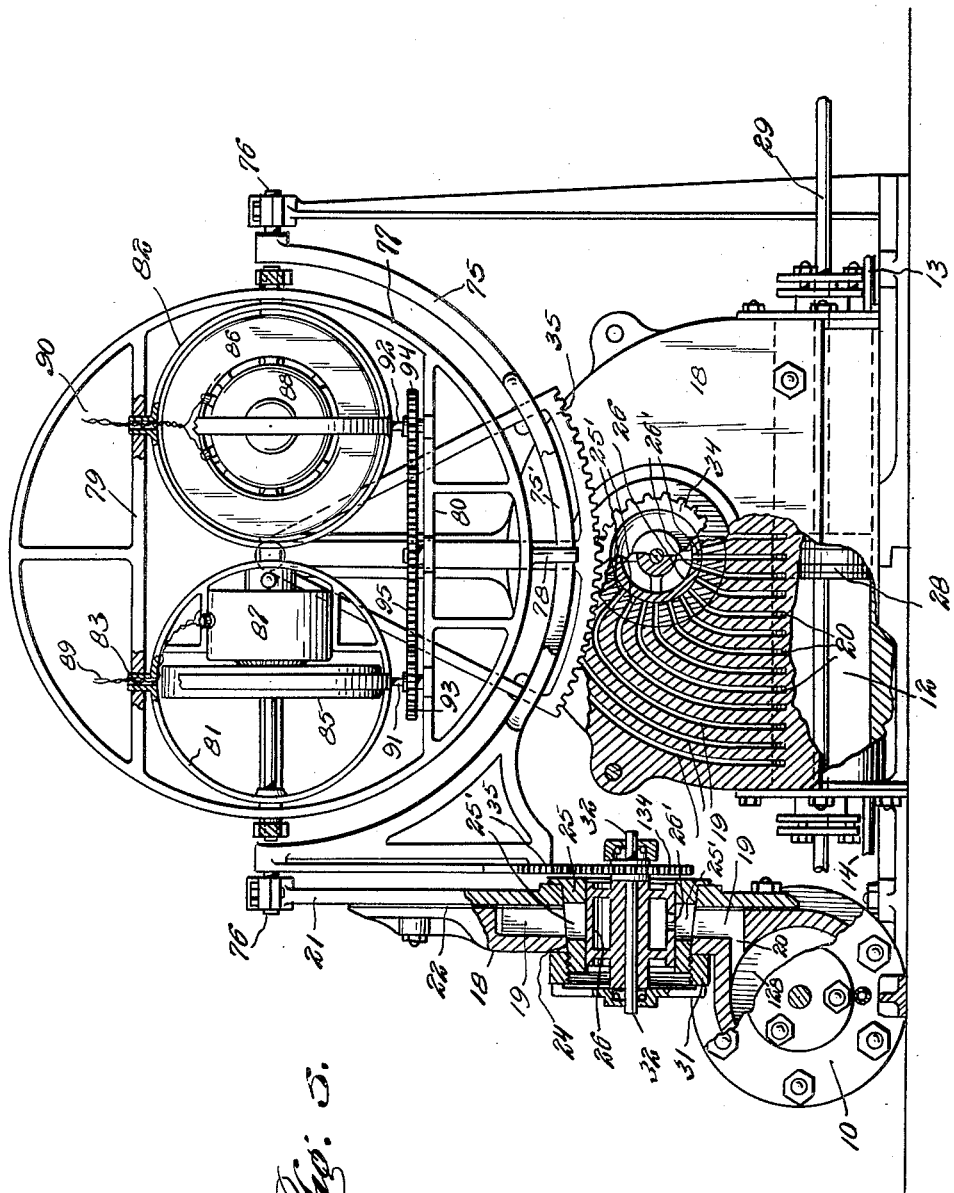

Nov. 27, 1923.
H. A. PETRIE
1,475,869
AUTOMATIC STABILIZER FOR AEROPLANES
Filed July 22, 1921   7 Sheets-Sheet 6
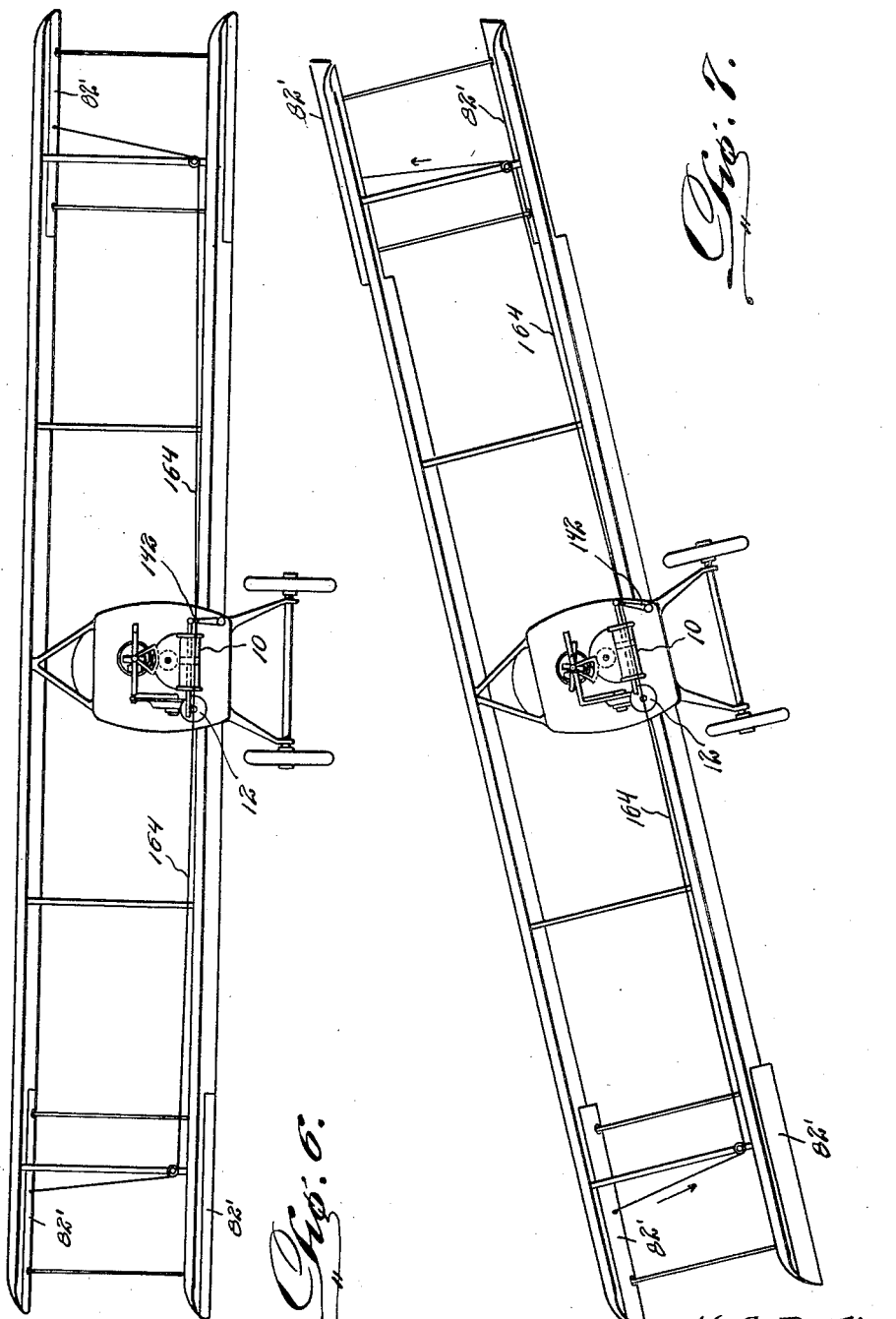

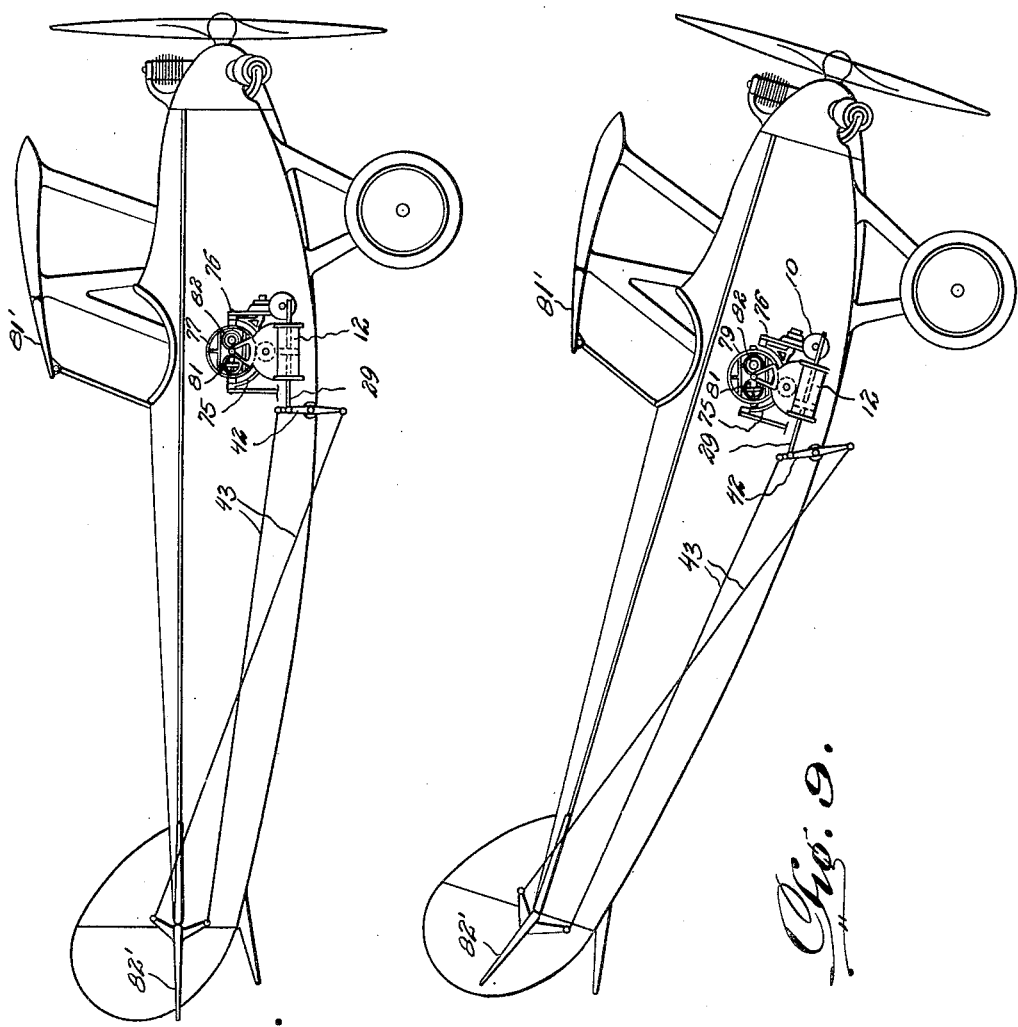

Patented Nov. 27, 1923.

1,475,869

UNITED STATES PATENT OFFICE.

HARRY A. PETRIE, OF HARRISBURG, PENNSYLVANIA.

AUTOMATIC STABILIZER FOR AEROPLANES.

Application filed July 22, 1921. Serial No. 486,753.

*To all whom it may concern:*

Be it known that I, HARRY A. PETRIE, a citizen of Harrisburg, residing at 1341 Vernon St., Harrisburg, in the county of Dauphin and State of Pennsylvania, have invented new and useful Improvements in Automatic Stabilizers for Aeroplanes, of which the following is a specification.

This invention relates to an automatic stabilizer for aeroplanes, and the object is to provide means for controlling the devices by which the lateral control of the plane is effected.

A further object is to provide automatic means for effecting such control, and means for throwing out the automatic means when the pilot desires to effect control of the ailerons by hand.

A still further object is to provide means for controlling the elevators of the plane automatically and by hand.

A still further object is to provide a particular form of governor acting in conjunction with air cylinders and plungers, and associated elements, for effecting the movement of the controlling surfaces for the purpose specified.

A still further object is to provide, in one form of the device, a governor comprising a plurality of gyroscopes rotatable in a certain predetermined relation hereinafter specified, in order that the resistance offered by the gyroscopes with reference to an outside force tending to alter the plane of rotation, will be manifest in a maximum degree under practically all conditions.

A still further object is to provide particular means for controlling the position of a plunger in an air cylinder by the relative movement taking place between the elements of the stabilizing device and of the plane.

With the foregoing and other objects in view, the invention consists in the novel construction, combination and arrangement of elements hereinafter described and claimed, it being understood that modifications may be made within the scope of the claims without departing from the spirit of the invention.

In the drawings, Figure 1 is a top plan view of the stabilizer; Figure 2 is a section on line 2—2 of Figure 1; Figure 3 is a section on line 3—3 of Figure 1; Figure 4 is an elevation looking from the right of Figure 1; Figure 5 is a section on line 5—5 of Figure 1 (portions being in elevation in each sectional view); Figures 6 and 7 show the device mounted on an airplane, and the results of inclination with reference to the transverse axis of the machine; Figures 8 and 9 show how the control is effected in the event of forward and downward inclination. (Figures 6 and 8 show the normal position, and Figures 7 and 9 the variation therefrom.)

In the practical embodiment of the invention, I provide a plurality of air cylinders 10 and 12, the plungers thereof being designed for connection with certain elements specified below for producing respectively the lateral control of the plane and the longitudinal control thereof. The plunger within the cylinder 12 controls the elevators, and this cylinder may be of less diameter than the cylinder 10, since less power is required for the longitudinal control. The cylinders and the air connections thereof are identical in other respects, and proceeding to the description of cylinder 12, it should be stated that air enters this cylinder at the opposite ends through the inlet connections 13 and 14, the air flowing from the tank 15, into which air is forced by a pump 16 driven in any suitable manner, as by means of one of the motors driving the propeller, or by means of an air screw.

Formed with the cylinder per se is an element 18 provided with a series of grooves or channels 19 constituting air ducts, the ports between these ducts and the cylinder being equally spaced and being designated 20. A plate 21 is bolted to the element 18, a suitable packing 22 being provided, and an air tight connection is thus effected.

The element 18 is provided with a circular opening 24 receiving a tapered sleeve 25 in which the valve 26 operates. Ports 25' are formed in the element 25, and two ports 26' are formed in the valve, and are so positioned that two adjacent air passages and the ports connected therewith are opened at a given time. The plunger 28 in the cylinder 12 is of such proportions that the ports leading to the air passages above mentioned are covered two at a time, as the plunger moves within the cylinder during the operation of the plane.

The outer end of the sleeve 25 is threaded externally and is engaged by the internal threads of a cap 31, the latter also providing bearings for the stem 32 of the valve.

Carried by the valve stem is a gear wheel 34 meshing with a segment 35 referred to below.

A piston rod 29 connected with the piston or plunger 28 carries at one end a forked element 37 which straddles a radial arm 38 serving to partly rotate or rock a shaft 39 mounted in bearings 39'. This shaft is a tubular shaft and is adapted for connection by a clutch with the concentric shaft 41 by means of which an arm or lever 42 is operated. This element last named serves to control the elevators by means of a connecting rod 43 having a forked member 44 secured thereto and pivotally secured to the arm or lever 42.

The radial arm 38 carries a hub member 45 having one notch or recess 46 for engagement by the single tooth 47 on the clutch collar 48 slidable on the shaft 41, the shaft being provided with a spline 41' acting to prevent the rotation of the collar. A hollow shaft 50 is provided with a clutch element 51 having one or more notches 52 therein, with which the tooth 53 cooperates. A spring 54 serves to normally hold the clutch collar 48 in engagement with the clutch element formed on the arm 38, in order that the movement of the element 38 will serve to rock the shaft 41 and move the arm 42 thereby automatically controlling the elevators.

The clutch element 48 is also under manual control through the medium of connecting wires or rods 55 operated by an angle lever 56 pivotally mounted at 57 and connected by means of a spring 58 and links of any suitable character with a controlling angle member 59 pivotally mounted on the lever 60, this lever being of the type employed for the usual stick control. It has previously been stated that the clutch is normally in position for permitting automatic control from the governor or gyroscope, but by the operation of the element 59 by the pilot, the clutch collar 48 is thrown into engagement with the clutch element 51, thereby releasing the arm 38 and throwing out the automatic control. The shaft 50 may now be rocked by the stick or lever 60, resulting in the corresponding movement of shaft 41 and of the lever 42 controlling the elevators, the tubular shaft 39 and radial arm 38 remaining unaffected. The socketed member 62 of the lever 60 has connected therewith, or formed thereon, a frame comprising a plurality of parallel elements 63 and 64, apertured centrally and receiving a pin 65 passing into a block 66 rigid with reference to shaft 50', whereby the shaft is rocked upon the movement of the lever 60 in a direction transversely of the shaft. A pin 68 on the frame just referred to passes through the slotted portion 69 of shaft 50, by means of which longitudinal control is effected, through the elevators.

The shaft 50 corresponds with the shaft 50' of the mechanism controlling the ailerons, and the clutch element, and associated parts operate in a similar manner, in each case. In the mechanism controlling the ailerons the radial arm 138 corresponds with the element 38, and is carried by a tubular shaft 139, and when the clutch element 148 is thrown in for automatic operation, the shafts 139 and 141 rotate together, operating the lever 142 and controlling the ailerons.

A clutch collar 148 is controlled or operated by the angle member 159 and angle member 156 connected therewith and with the collar 148. The shafts 50 and 50" are at right angles with reference to each other, and the shaft 50 includes an offset member, forming a type of crank, slotted as described, the slot receiving pin 68. This construction permits the controlling lever or stick 60 to rock either shaft, the shafts being in the same plane, disregarding for the moment the offset portion of the shaft 50. When the shaft 50' is rocked, the pin 68 of course moves within the slot without causing the rotation of the shaft 50. The plunger 128 of the cylinder 10 operates the piston rod 129, and is in connection with devices operating the ailerons. These devices include an arm 160, shaft 161, an arm 162, a rod 163, and an arm 138, this particular arrangement being employed if circumstances require. Arm 138 operates or rocks hollow shaft 139, and the shaft 141, and throws lever 142 connected with rods 164 leading to the ailerons.

Associated with the cylinder 10 is the valve 126, the stem of which carries rigidly a gear wheel 134 meshing with a segment 135, and the segments 35 and 135 are in direct connection with the gyroscopic or other form of governor.

The frame 75 of the gyroscope swings on trunnions 76, and the pivoted frame 77 carries a projecting element 78 movable in the slot 75' of the frame 75. The axes about which the frames are tiltable, are perpendicular with reference to each other.

The frame 77 includes a plurality of members 79 and 80 parallel with each other, and connected with the circumferential portion of the frame 77 in the manner shown. The elements 79 and 80 are provided with bearings for the axial members of the gyroscope rings 81 and 82. These devices 81 and 82 are more properly termed frames and the axial members 83 and 84 of the gyroscopes are mounted in these frames, in the same plane, but are perpendicular with reference to each other, so that the gyroscopes 85 and 86 rotate in planes at right angles with reference to each other.

The motors 87 and 88 for rotating the gyroscopes, receive current through wires 89 and 90, respectively, the wires passing through the tubular axial members of the frame 81 and 82.

The oppositely located axial members 91 and 92 carry respectively gear wheels 93 and 94 of the same diameter and meshing with a central gear wheel 95 mounted for rotation about an axis coincident with the vertical axis of the frame 77. This construction permits of the operation described below.

A gyroscope arranged to rotate on a horizontal axis and supported in a frame rotatable on a vertical axis will offer more resistance to an outside force tending to force the gyroscope out of its original plane, than one mounted in a rigid frame. In so doing however it will impart a rotary motion to the frame, such as the frame 81 or 82, the direction of movement depending on the direction in which the gyroscope is rotating. The gyroscope will also offer more resistance to the exterior force when the frame in which it is mounted is rotating on its vertical axis freely, but a force brought to bear on a gyroscope so mounted, in the plane in which it is rotating will not be resisted by the gyroscope, although a force brought to bear in a plane at a right angle, or at any other angle, to the plane in which the gyroscope is rotated will be resisted, and a rotary motion will be imparted to the frame in which it is mounted. It will be seen therefore that since in the present case the gyroscopes are mounted in frames at right angles to each other, one of them will always be in position to resist a force brought to bear on the frame 77, from any angle. But in resisting this force, the frame supporting the gyroscope which is in position to offer the most resistance to the exterior force, will rotate on its vertical axis, and the gyroscope will be turned into such a position as to offer no resistance to the exterior force. The movement of the frame supporting the gyroscope will however be communicated through the gearing referred to and including elements 93, 94 and 95, to the frame supporting the other gyroscope, turning it in the same degree, or through the same angle and placing said gyroscope in a position to resist the external force. Therefore one of the gyroscopes will always be in a position to resist a force brought to bear on the mechanism and tending to force it from its original position. In many instances, both gyroscopes will be in a position to resist the applied force, or they will alternate in rapid succession in resisting that force. The gyroscopes of course rotate in the same direction, either clockwise or in the reverse direction, because if they rotate reversely with reference to each other they will neutralize each other, and fail to produce the resistance to an exterior force, required for effecting the desired result.

The governor is to be placed under the pilot's seat, with the shift mechanism at a lower level, and under the floor of the fuselage, this arrangement however being subject to change to meet the requirements of different types of planes. The rudder bar is shown in Figure 1, and also the relative position of the air tank and the cylinders. In the diagrammatic view the ailerons are designated 81' and the elevators are shown at 82'.

When the air craft is thrown out of the plane representing its stabilized position, this plane being at a right angle with reference to the plane of the gyroscopic governor, the governor tends to maintain its original plane, with reference to the air craft. This causes one frame or the other of the gyroscopes, depending upon whether the change of plane is in a lateral or longitudinal direction, to move in harmony with the governor, transmitting an equal movement to pinion 93 or 94 and thence to valve 26 or valve 126 causing the valve thus operated to register with the ports illustrated in Figure 5, the movement being to the right or to the left of the central position, depending upon the direction of change of plane. As these ports are opened, the air pressure on the side of the piston or plunger affected is reduced by the air escaping through these ports. The inlet ports for the cylinders 10 and 12 are smaller than the outlet ports, permitting the air to escape faster than the pressure is renewed or built up from the air tank. The piston thus moves to the side of reduced pressure until it covers two adjacent ports, closing them and preventing further escape of air, thus causing the pressure to be again equalized by the flow of air from the tank.

The connections between the plungers and the stabilizing surfaces are such that the surfaces are moved upwardly or downwardly in such degree as to correct the position of the air craft which caused the movement of the governor in relation to the plane of the craft and which set in motion the stabilizing mechanism.

As the air craft returns to stabilized position, the governor also moves back to its original position, with reference to the air craft, causing a reverse movement in the stabilizing mechanism, the valve 26 or valve 126 moving back to its central position and opening the ports on the other side of the piston for reducing the pressure on that side, and causing the piston to move in that direction until it covers the opened ports. This movement, as before, is communicated to the stabilizing surfaces, so that as the air craft returns to a stabilized position these surfaces return to their central position. The stabilizing surfaces are therefore always in a position to correct the plane of the air craft at that particular moment, and as the craft moves back to its correct position, the stabilizing surfaces are moved accordingly.

What is claimed:

1. In mechanism of the class described, a lever, ailerons and controlling means therefor operable upon the manual operation of the lever, elevators and controlling means therefor operable upon the manual operation of the lever in another direction, and automatic means governing the operation of the controlling means for the ailerons and elevators, said automatic means including cylinders perpendicular to each other, valves having their axes perpendicular to the respective cylinders, gyroscopes, and means for controlling the valves from the gyroscopes.

2. In mechanism of the class described, a lever, ailerons and controlling means therefor operable upon the manual operation of the lever, elevators and controlling means therefor, operable upon the manual operation of the lever in another direction, and automatic means governing the operation of the controlling means for the ailerons and elevators, said automatic means including cylinders perpendicular to each other, valves having their axes of rotation perpendicular to the respective cylinders, gyroscopes and means for maintaining their axes of rotation perpendicular to each other, and means for controlling the valves from the gyroscopes.

3. In mechanism of the class described, a shaft, means controlling an elevator or the like by the rotation of the shaft, spaced engaging elements loosely mounted on said shaft, one of the engaging elements being automatically controlled and the other being controlled manually, and a third engaging element through which rotation may be imparted to the shaft when this engaging element co-acts with either of the engaging elements first named.

4. In mechanism of the class described, a shaft, means controlling an elevator or the like by the rotation of the shaft, spaced engaging elements loosely mounted on the shaft, one of the engaging elements being automatically controlled and the other being controlled manually, and a third engaging element through which rotation may be imparted to the shaft when this engaging element co-acts with either of the engaging elements first named, tubular elements mounting two of the engaging elements, the third engaging element being longitudinally movable in two directions, between the engaging elements first named.

5. In mechanism of the class described, a lever, stabilizing surfaces, an air cylinder and a plunger therein, a governor including a gyroscope, a housing providing a valve chamber, a valve controlling the admission of air to the cylinder for operating the plunger upon a relative change in position between the cylinder and the gyroscope, a shaft, connections between the lever and the shaft, permitting the latter to be rocked manually upon the movement of the lever, means for effecting the automatic control of the shaft through the medium of the governor, said housing having air ducts entering the cylinder along a longitudinal line and entering the valve chamber in circumferential series, and means for shifting the stabilizing surfaces upon the movement of the shaft.

6. In mechanism of the class described, a lever, stabilizing surfaces, an air cylinder and a plunger therein, a governor including a gyroscope, a housing providing a valve chamber, a valve controlling the admission of air to the cylinder for operating the plunger upon a relative change in position between the cylinder and the gyroscope, a shaft, connections between the lever and the shaft, permitting the latter to be rocked manually upon the movement of the lever, means for effecting the automatic control of the shaft through the medium of the governor, said housing having air ducts entering the cylinder along a longitudinal line and entering the valve chamber in circumferential series, means for shifting the stabilizing surfaces upon the movement of the shaft, and means for throwing out the automatic controlling means.

7. In mechanism of the class described, a plurality of shafts at an angle with each other, means connected with the shafts for controlling respectively the movement of an air craft about its longitudinal axis and its transverse axis, a lever manually operable for rocking either shaft, a governor and means connected therewith for controlling either shaft automatically, and means associated with the lever for throwing out the automatic control and simultaneously placing either shaft under manual control.

8. In mechanism of the class described, a plurality of shafts at an angle with each other, means connected with the shafts for controlling respectively the movement of an air craft about its longitudinal axis and its transverse axis, a lever manually operable for rocking either shaft, a governor and means connected therewith for controlling either shaft automatically, and means associated with the lever for throwing out the automatic control and simultaneously placing either shaft under manual control, said lever being mounted on one of the shafts and being movable in one direction for rocking that shaft, and means including a slotted crank on the other shaft, causing the shaft last named to be independently rocked upon the movement of the lever in another direction.

9. In mechanism of the class described, a plurality of shafts at an angle with each other one of the shafts including a slotted crank portion, means connected with these shafts for controlling respectively the movement of an air craft about axes perpendicular to each other, a lever for manually rocking either shaft the lever passing through the slotted crank portion, a governor and fluid pressure means connected therewith for controlling either shaft automatically, and means associated with the lever for throwing out the automatic control of either shaft and simultaneously placing said shaft under manual control.

10. In mechanism of the class described, a gyroscopic governor including a plurality of frames pivoted for movement about axes perpendicular to each other, a plurality of air cylinders and plungers therein, means for admitting air to the cylinders on opposite sides of the plungers, means permitting the reduction of air pressure on one side of a given plunger upon relative movement between the elements of the governor and the axis of an aircraft, said means including valve housings having radial ports, the cylinders having ports in longitudinal series and in communication with the ports of the housings, valves within the housings and having ports registering with some of the ports of said housings, stabilizing surfaces, and connections between said surfaces and the plungers.

11. In mechanism of the class described, a gyroscopic governor including a plurality of frames pivoted for movement about axes perpendicular to each other, a plurality of air cylinders and plungers therein, means for admitting air to the cylinders on opposite sides of the plungers, and means permitting the reduction of the air pressure on one side of a given plunger, at a given time, upon relative movement between the governor and an axis of an air craft, said means including valve housings having radial ports, the cylinders having ports in longitudinal series and in communication with the ports of the housings, valves within the housings and having ports registering with some of the ports of said housings, the degree of pressure reduction being determined by the extent of relative movement specified, stabilizing surfaces and connections between said surfaces and the plungers.

12. In mechanism of the class described, a frame, stationary mounting means whereby the frame is supported for pivotal movement, a plurality of frames pivoted on vertical axes in the frame first named, a gyroscope mounted on a horizontal axis in each of the frames last named, the axes of the gyroscopes being perpendicular to each other, intermeshing devices for maintaining perpendicular relation, a slotted segmental frame in the plane of the frame first named, means on the frame first named engaging the slotted portion, stabilizing surfaces, and means controlling the latter by relative movement between the mounting means and the gyroscope.

13. In mechanism of the class described, a frame, stationary mounting means whereby the frame is supported for pivotal movement, a plurality of frames pivoted on vertical axes in the frame first named, a gyroscope mounted on a horizontal axis in each of the frames last named, the axes of the gyroscopes being perpendicular to each other, intermeshing devices for maintaining perpendicular relation, a slotted segmental frame in the plane of the frame first named, means on the frame first named engaging the slotted portion, stabilizing surfaces, and fluid pressure means controlling the stabilizing surfaces by relative movement between the mounting means and the gyroscope, said fluid pressure means including valves rotatable on axes perpendicular to each other and having radial ports in circumferential series controlled by the aforesaid relative movement between the mounting means and gyroscope, the slotted frame controlling the valves.

In testimony whereof I affix my signature.

HARRY A. PETRIE.